Jan. 13, 1931.  M. W. MOESTA  1,789,015
MEANS FOR SECURING AND RETAINING TRIM AND UPHOLSTERY
Filed Aug. 11, 1927
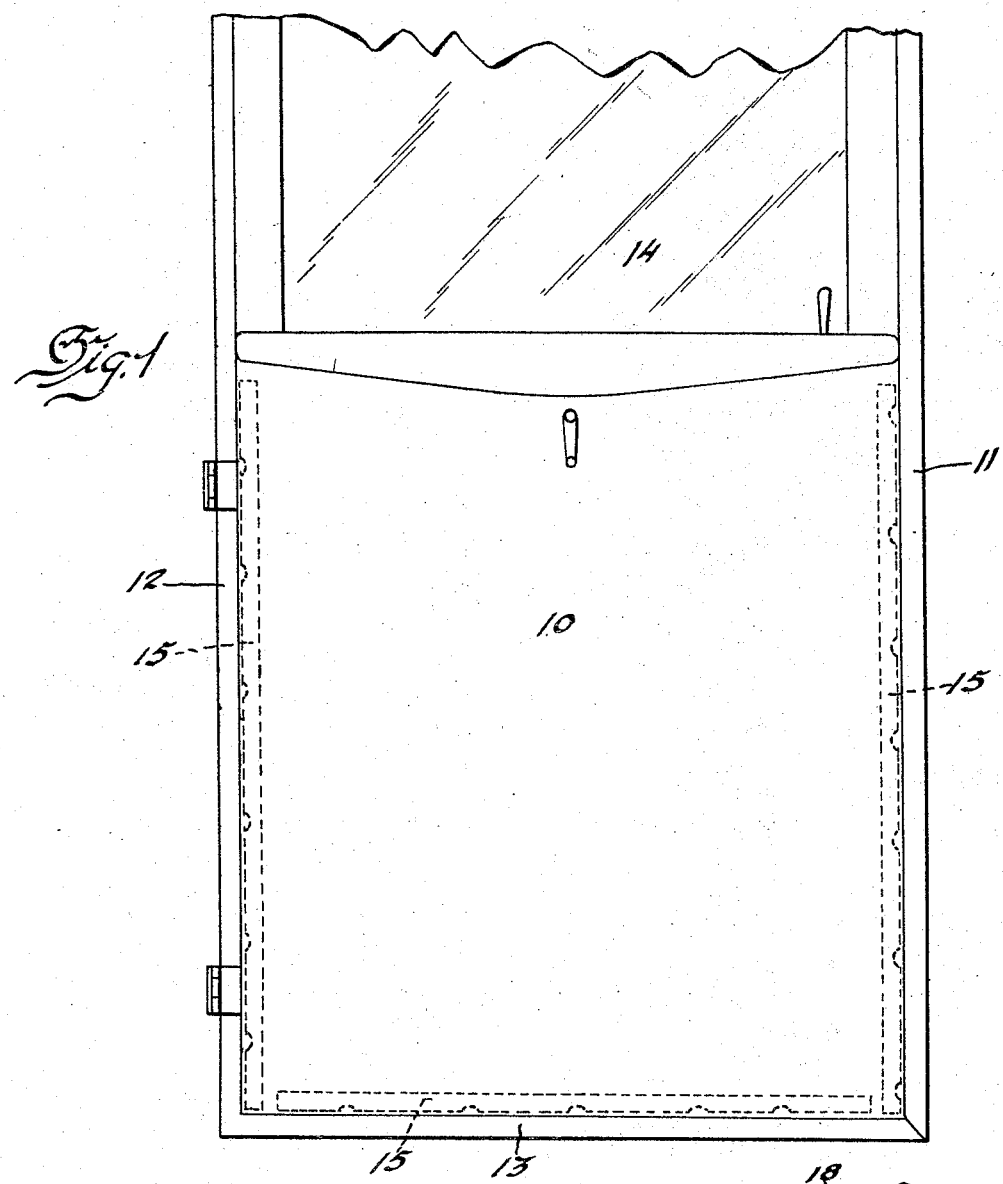
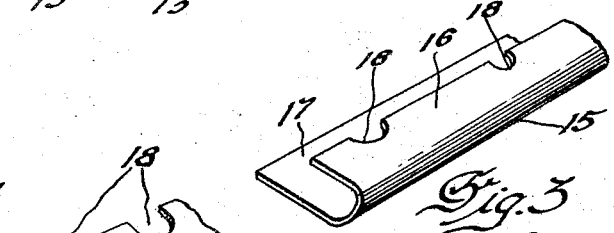
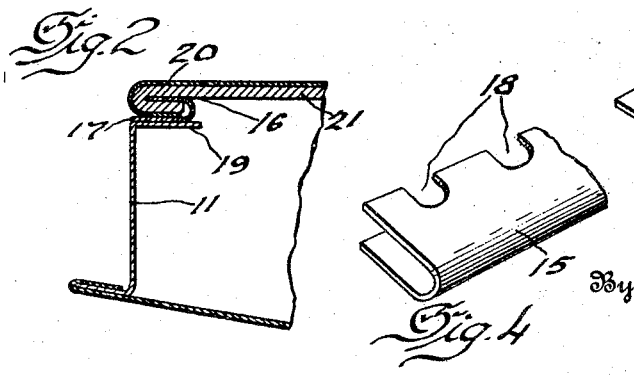
Inventor
Marvin W. Moesta
By J King Harness
Attorney Patented Jan. 13, 1931

1,789,015

UNITED STATES PATENT OFFICE

MARVIN W. MOESTA, OF DETROIT, MICHIGAN, ASSIGNOR TO THE MURRAY CORPORATION OF AMERICA, A CORPORATION OF DELAWARE

MEANS FOR SECURING AND RETAINING TRIM AND UPHOLSTERY

Application filed August 11, 1927. Serial No. 212,169.

One object of my invention is to provide cheap and simple means for securing trim or unholstery surfaces which it is desired to cover.

Another object of my invention is to provide means for securing trim or upholstery to a surface without the necessity of penetrating the trim or upholstery with fasteners.

Another object of my invention is to provide means for securing trim or upholstery to surfaces which will for all practical purposes be invisible.

With these and other objects in view, my invention consists in the arrangement, combination and construction of various parts of my improved device as described in the specification, claimed in my claims, and shown in the accompanying drawings in which,—

Fig. 1 is an elevation of the inside of an automobile door, having my invention applied thereto.

Fig. 2 is a cross section of one pillar of the door shown in Fig. 1, showing my invention applied thereto.

Fig. 3 is a perspective of the securing means embodied in my invention.

Fig. 4 is a modification of the securing means embodied in my invention.

I have shown an automobile door 10, having a front pillar 11 and a rear pillar 12 and a bottom cross member 13 and having an opening in the upper portion thereof in which is disposed a sliding glass panel 14. It is desired to cover the inner surface of the door below the opening with trim or upholstery, which is usually spread upon and secured to card board stiffener. In Fig. 3 I have shown a U-shaped strip 15 having one U side 16 shorter than the other U side 17 and having a plurality of recesses 18 in the edge of the side 16. The strip 15 is applied lengthwise to the pillars as shown in Figs. 1 and 2, the long side 17, spot-welded to the pillar flange 19, when the pillars are of steel, with the short side 16 extending toward the edge of the door. When the pillars are of wood the strips may be fastened thereto by nails, screws or other suitable means. Like strips are applied to the rear pillar 12 with the free edge 16 of the strip 15 extending toward the edge of the door and also to the bottom cross member 13 of the door, with the free edge 16 extending toward the bottom of the door. When the strips 15 are secured to the door pillars and cross member of the door by spot-welding, the recess 18 on the short side 16 of the strip 15 are provided to accommodate the welder electrode. When the strips 15 are secured by nails or screws the recesses 18 will permit the nails or screws to be inserted without interfering with the U side 16. A trim which comprises a sheet of upholstery 20 spread over a cardboard stiffener 21 is applied to the door by return bending the side and bottom edges of the trim and sliding the return bent edges between the sides 16 and 17 of the strips 15. The trim may then be securely fastened by applying pressure to the short sides 16 of the strips 15 and bending the same inwardly to firmly clamp the return bent edges of the trim against the long sides 17 of the strips 15. Thus, a very efficient and easily applied trim securing means is provided which secures the trim tightly to the door and which grips evenly the entire edges of the trim and prevents drawing, and which provides an invisible fastener means and thereby enhances the appearance of the upholstery. I have shown the strip 15 as having one U side shorter than the other as the preferable form. The side 17 presents a working surface when it is desired to crimp the edge of the trim over the narrow side 16 and acts to guide the edge into the channel of the U member as it is being crimped over. When the trim is prepared with the edges ready crimped and is slid longitudinally of the door upon the strips, the wide side 17 also acts to guide the bent edge into the channel of the member. I wish it understood however, that my invention includes strips having U sides of equal width as shown in Fig. 4 or any other dimensions in relation to each other.

It will be obvious that various changes may be made in the arrangement, combination and construction of the various parts of my improved device without departing from the spirit of my invention and it is my intention to cover by my claims such changes as may be reasonably included within the scope thereof.

What I claim is:

1. In combination with a frame adapted to have an upholstered cover panel spread thereover, U shaped members having substantially parallel flanges secured to the borders of said frame by one flange of the U and with the mouths of the U members facing toward the edges of said frame, and a panel member spread upon said frame and covering said U members and having its edges bent over the unattached flanges of said U members and extended into the mouths of said U members and fastened therein by being gripped between the flanges of said U members.

2. In combination with a frame adapted to have an upholstered cover panel spread thereover, U shaped members having substantially parallel flanges and having one side wider than the other and secured to the borders of said frame by the wider side and with the mouths of the U members facing toward the edges of said frame, and a panel member spread upon said frame and covering said U members and having its edges bent over the unattached flanges of said U members and extended into the mouths of said U members and fastened therein by being gripped between the flanges of said U members.

MARVIN W. MOESTA.